US007986447B2

(12) United States Patent
Bang et al.

(10) Patent No.: US 7,986,447 B2
(45) Date of Patent: Jul. 26, 2011

(54) COLOR IMAGE SCANNING SYSTEM, METHOD AND MEDIUM

(75) Inventors: Yousun Bang, Seoul (KR); Min-ki Cho, Seoul (KR); Se-eun Kim, Suwon-si (KR); Heui-keun Choh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 320 days.

(21) Appl. No.: 11/898,657

(22) Filed: Sep. 13, 2007

(65) Prior Publication Data
US 2008/0158626 A1 Jul. 3, 2008

(30) Foreign Application Priority Data

Dec. 28, 2006 (KR) ........................ 10-2006-0136787

(51) Int. Cl.
*G03F 3/08* (2006.01)
(52) U.S. Cl. ......... 358/518; 358/1.9; 358/504; 358/505; 358/520; 358/522; 358/523; 382/162; 382/163; 382/167; 345/600; 345/601; 345/602
(58) Field of Classification Search .................. None
See application file for complete search history.

(56) References Cited

U.S. PATENT DOCUMENTS

| | | | | |
|---|---|---|---|---|
| 5,953,450 | A * | 9/1999 | Kanamori | 382/171 |
| 6,075,614 | A * | 6/2000 | Ohtsuka et al. | 358/1.1 |
| 6,351,320 | B1 * | 2/2002 | Shin | 358/1.9 |
| 6,373,575 | B1 * | 4/2002 | Takayama et al. | 356/445 |
| 2001/0028796 | A1 * | 10/2001 | Yamanaka et al. | 396/281 |
| 2003/0103222 | A1 * | 6/2003 | Kato et al. | 358/1.9 |
| 2006/0098219 | A1 * | 5/2006 | Kajihara | 358/1.9 |
| 2007/0019254 | A1 * | 1/2007 | Zeng | 358/504 |
| 2008/0062442 | A1 * | 3/2008 | Olson | 358/1.9 |

FOREIGN PATENT DOCUMENTS

| | | |
|---|---|---|
| JP | 9-186892 | 7/1997 |
| JP | 10-282737 | 10/1998 |
| JP | 10-308878 | 11/1998 |

(Continued)

OTHER PUBLICATIONS

Korea Office Action for corresponding Korea Patent Office Action mailed Nov. 29, 2007 (pp. 1-5).

(Continued)

*Primary Examiner* — Twyler L Haskins
*Assistant Examiner* — Miya J Cato
(74) *Attorney, Agent, or Firm* — Staas & Halsey LLP

(57) ABSTRACT

A color image scanning system, method and medium that generates look-up tables for color data correction based on the type of printing paper and the kind of image on the printing papers, thereby improving color reproducibility upon scanning.

A color image scanning system may include a storage unit to store look-up tables having correction values of first color data, obtained by scanning a first printing paper having a plurality of color patches, each of the look-up tables corresponding to a type of printing paper, and a final image generation unit to correct second color data, obtained by scanning a second printing paper, with reference to a look-up table of the look-up tables, the look-up table corresponding to the type of printing paper used by the second printing paper.

32 Claims, 13 Drawing Sheets
(7 of 13 Drawing Sheet(s) Filed in Color)

FOREIGN PATENT DOCUMENTS

| | | |
|---|---|---|
| JP | 2003-270731 | 9/2003 |
| KR | 1999-0059643 | 7/1999 |
| KR | 10-2006-0057064 | 5/2006 |

OTHER PUBLICATIONS

"Scanner profiles maximize color fidelity", Web URL: <http://http://www.microsoft.com/windowsxp/using/digitalphotography/prophoto/scannerprofiling.mspx>, Published on Jun. 20, 2005, Accessed on Apr. 4, 2007. (5 pages).

"Profiling Your Scanner and Digital Camera", Web URL: <http://www.signindustry.com/computers/articles/2004-10-01-GIA-ProfilingScannerCamera.php3>, Accessed on Apr. 4, 2007. (8 pages).

* cited by examiner

COLOR IMAGE SCANNING SYSTEM, METHOD AND MEDIUM

CROSS-REFERENCE TO RELATED APPLICATIONS

This application claims priority from Korean Patent Application No. 10-2006-0136787 filed on Dec. 28, 2006 in the Korean Intellectual Property Office, the disclosure of which is incorporated herein by reference in its entirety.

BACKGROUND

1. Field

One or more embodiments of the present invention relate to a color image scanning system, method and medium, and in particular, to a color image scanning system, method and medium that, according to the kind of a printing paper and the kind of an image in the printing paper, corrects color data of an image obtained by scanning the printing paper, thereby improving color reproducibility.

2. Description of the Related Art

A scanner refers to an apparatus that optically recognizes characters and pictures and converts them into digital signals. Color information obtained by a sensor of the scanner has errors in comparison with the actual color information. In order to reduce the errors, scanner profiling should be performed before document scanning.

Scanner profiling includes a process of scanning a target chart having printed thereon a plurality of sample hues with a scanner so as to acquire a target image, and a process of, with reference to a reference table, in which original CIE LAB values of the sample hues are recorded, recording RGB values obtained by the sensor of the scanner relative to the sample hues and original LAB values in the reference table, and storing the table.

However, according to the related art, since scanner profiling is performed without taking the type of a printing paper into account, when any printing paper is scanned, an undesired hue may be reproduced. Printing papers have different color properties and reproduction ranges according to the type of printing paper, but known scanner profiling is performed not taking this fact into account. Accordingly, when any printing paper is scanned, even if colors are corrected according to a prescribed profile, hues different from the original hues may be reproduced.

Further, in the related art, the kind of image on a printing paper that a user wants to scan is not taken into account. For this reason, it may be difficult to reproduce colors according to properties of an image on a printing paper.

Accordingly, there is a need for a method that performs scanner profiling in consideration of the type of a printing paper and the kind of an image, thereby improving color reproducibility of a document to be scanned.

SUMMARY

One or more embodiments of the present invention provide a color image scanning system, method and medium that performs profiling in consideration of the type of a printing paper and the kind of an image in the printing paper, thereby improving color reproducibility of a scanned image.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a color image scanning system including a storage unit to store look-up tables having correction values of first color data, obtained by scanning a first printing paper having a plurality of color patches, each of the look-up tables corresponding to a type of printing paper, and a final image generation unit to correct second color data, obtained by scanning a second printing paper, with reference to a look-up table of the look-up tables, the look-up table corresponding to the type of printing paper used by the second printing paper.

To achieve at least the above and/or other aspects and advantages, embodiments of the present invention include a color image scanning method including storing look-up tables having correction values of first color data, obtained by scanning a first printing paper having a plurality of color patches, each of the look-up tables corresponding to a type of printing paper, and correcting second color data, obtained by scanning a second printing paper, with reference to a look-up table of the look-up tables, the look-up table corresponding to the type of printing paper used by the second printing paper.

To achieve at least the above and/or other aspects and advantages, embodiments of the present invention include a scanner profiling method including, generating look-up tables by scanning a first printing paper having a plurality of color patches, each of the look-up tables having correction values corresponding to a type of printing paper, and correcting a color image scanned from a second printing paper, based on a look-up table of the generated look-up tables, the look-up table corresponding to the type of printing paper used by the second printing paper.

BRIEF DESCRIPTION OF THE DRAWINGS

The patent or application file contains at least one drawing executed in color. Copies of this patent or patent application publication with color drawings will be provided by the Office upon request and payment of the necessary fee. These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
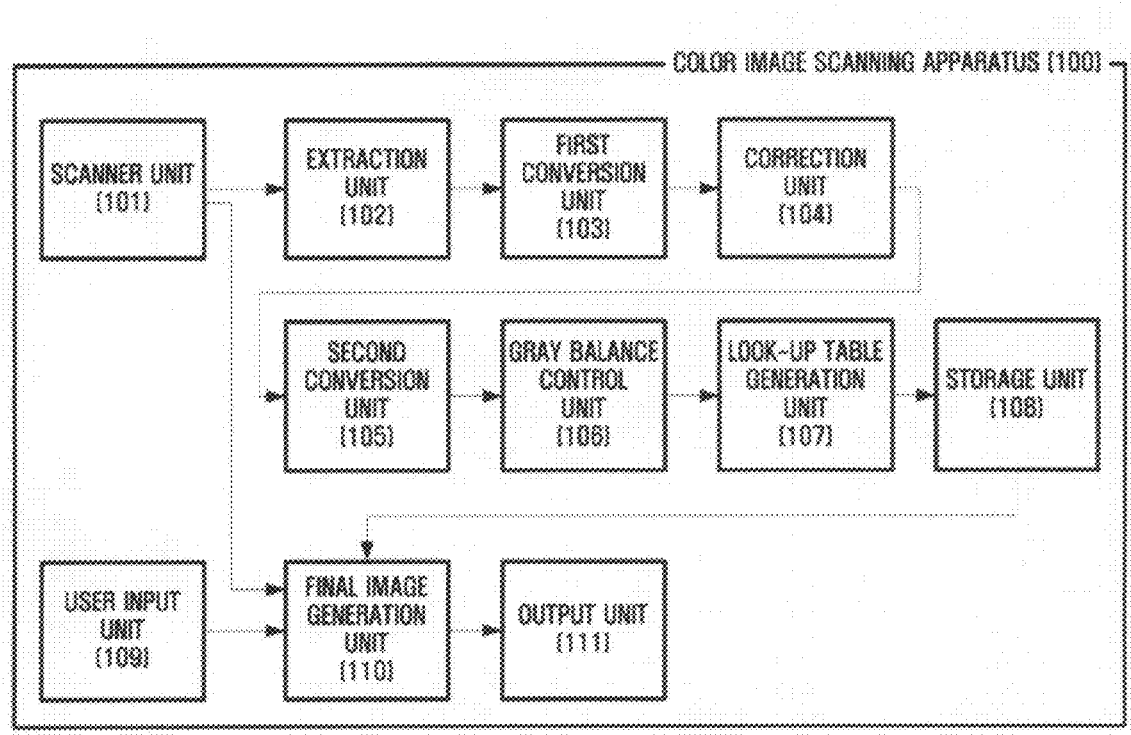
FIG. 1 illustrates the configuration of a color image scanning system, according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A color image scanning system, according to an embodiment of the present invention may generate look-up tables according to types of printing papers and kinds of images in the printing papers using a test chart (hereinafter, referred to as "first printing paper") having a plurality of color patches. Then, the color image scanning system may correct second color data, obtained by scanning of a second printing paper, with reference to a corresponding look-up table of the look-up tables, thereby generating a final image. In the following description, examples of the printing papers may include, without limitation, a paper for a laser printer, a paper for an offset printer, a photographic paper, and a paper for an ink jet printer. In addition, the images may be classified, for example, into a character image, a graphic image, and a general image.

FIG. 1 illustrates the configuration of a color image scanning system 100, according to an embodiment of the present invention. As shown in FIG. 1, the color image scanning system 100 may include, for example, a scanning unit 101, a user input unit 109, a storage unit 108, an extraction unit 102, a first conversion unit 103, a correction unit 104, a second conversion unit 105, a gray balance control unit 106, a look-up table generation unit 107, a final image generation unit 110, and an output unit 111.

The scanning unit 101 may scan a first printing paper 300 having a plurality of color patches, and generate first color data corresponding to the first printing paper 300. Here, the first printing paper 300 may be described in brief with reference to FIG. 2.

Figure 2:
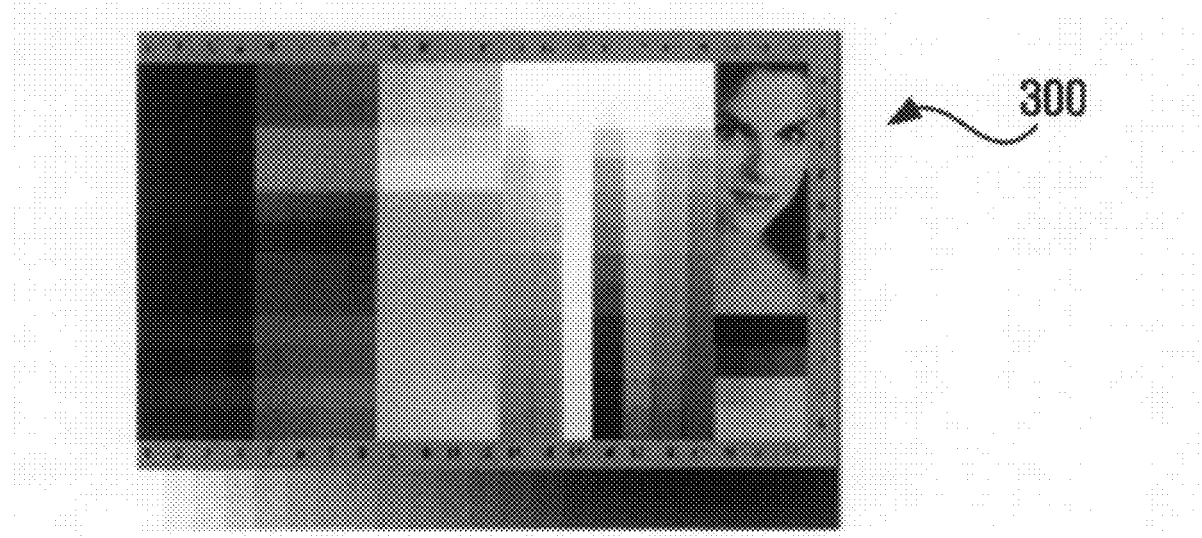
FIG. 2 illustrates a first printing paper for profiling in a color image scanning system, according to an embodiment of the present invention.

FIG. 2 is a diagram showing, as an example, Kodak™ IT8.7/2 as the first printing paper 300. As shown in FIG. 2, a plurality of color patches including chromatic colors and achromatic colors may be printed on the first printing paper 300. The first printing paper 300 may be used for profiling the color image scanning system 100.

Returning to FIG. 1, the scanning unit 101 may scan the first printing paper 300 and generate first color data. Similarly, the scanning unit 101 may scan a second printing paper that a user wants to scan, and generate second color data including color information relative to the second printing paper. At this time, the second color data may be supplied to the final image generation unit 110.

The scanning unit 101 may be incorporated within or physically separated from the color image scanning system 100 in hardware. When the scanning unit 101 is separated from the color image scanning system 100 in hardware, the scanning unit 101 may supply the first color data to the color image scanning system 100 through an arbitrary communication medium. At this time, examples of the communication medium that may be used to connect the scanning unit 101 to the color image scanning system 100 include without limitation, wired mediums, such as a USB cable, a serial or parallel port cable, and an optical cable, and wireless mediums, such as IR and RF.

The storage unit 108 may store standard measurement values (for example, values corresponding to CIE LAB color coordinates or values corresponding to CIE XYZ color coordinates) of the plurality of color patches printed on the first printing paper 300. The standard measurement values are generally numerical representations of hues of the individual color patches. The standard measurement values may be obtained by measuring the hues of the individual color patches using a colorimeter. In addition, the storage unit 108 may store look-up tables. The look-up tables may include the standard measurement values of the color patches and correction values corresponding to the standard measurement values. A plurality of look-up tables may exist according to the types of printing papers and kinds of images. The storage unit 108 may be, without limitation, implemented by a nonvolatile memory element, such as a cache, a ROM (Read Only Memory), a PROM (Programmable ROM), an EPROM (Erasable Programmable ROM), an EEPROM (Electrically Erasable Programmable ROM), or a flash memory, a volatile memory element, such as a RAM (Random Access Memory) or the like, or a storage medium, such as an HDD (Hard Disk Drive) or the like.

Figure 3:
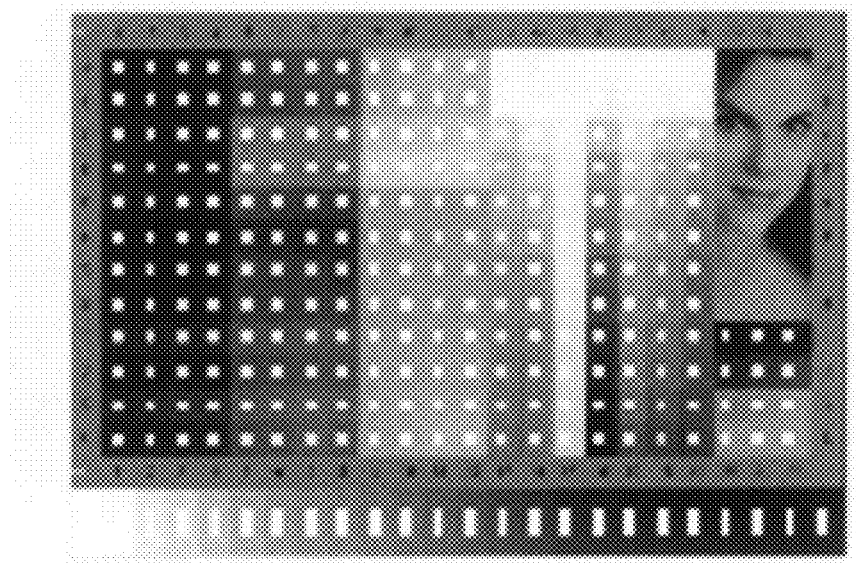
FIG. 3 illustrates an example in which RGB data is extracted from individual color patches in first color data obtained by scanning a first printing paper.

The extraction unit 102 may extract an average RGB value from the individual color patches of the first color data. In order to extract the average RGB value of the individual color patches, as shown in FIG. 3, the extraction unit 102 may extract RGB values of the central portions of the individual color patches. Next, the extraction unit 102 may calculate a CIE LAB value (or a CIE XYZ value) corresponding to the average RGB value of the individual color patches and supply the calculated value to the first conversion unit 103.

Figure 4:
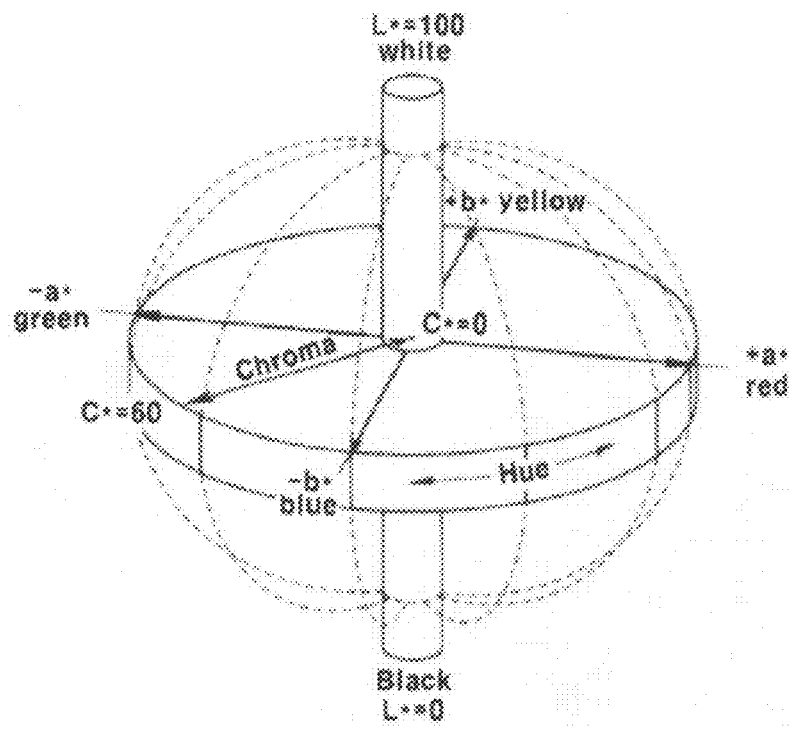
FIG. 4 illustrates a colorimetric coordinate of a CIE LCH color space.

The first conversion unit 103 may convert the CIE LAB values of the individual color patches supplied from the extraction unit 102 into color coordinates including lightness, hue, and chroma, for example, CIE LCH values. Here, a CIE LCH (for reference, a color coordinate in the CIE LCH is represented by L*, C*, and h) color space may be described in brief. The CIE LCH (L*C*h) color space is one of the standard colorimetric systems defined by the CIE and uses the same diagram as CIE LAB (for reference, a color coordinated in the CIE LAB is represented by L*, a*, and b* (where L* represents lightness, a* represents a degree of red and green, and b* represents a degree of yellow and blue)). While the CIE LAB color space typically uses a square coordinate system, the CIE LCH color space may use a cylindrical coordinate system, as shown for example in FIG. 4. In the CIE LCH color space, L* represents lightness, C* represents chroma, and h represents hue. The chroma C* may be represented by a distance from the center of the circle to the edge of the circle. In addition, the hue h may be represented by an angle ranging from 0 to 360°. For example, 0°, 90°, 180°, 270°, and 360° (that is, 0°) may represent red, yellow, green, blue, and red, respectively.

Returning to FIG. 1, the correction unit 104 may correct at least one of the lightness, hue, and chroma of the CIE LCH values supplied from the first conversion unit 103 according to the types of printing papers and kinds of images.

First, a process in which the correction unit 104 may adjust the lightness of the CIE LCH values according to the types of printing papers will be described. The lightness of black is differently reproduced according to the types of printing papers. For example, the lightness of black in a laser printer paper is reproduced brighter than that in a photographic paper. As a result, when an image is generated by scanning a paper for a laser printer, a black region is generally reproduced brighter than an original value. In order to prevent this phenomenon, it is necessary to adjust the black region of an image to be scanned more darkly, thereby reducing a difference in lightness between a final image and an original image. Upon correction of the lightness of the CIE LCH values, in order to perform the correction according to the types of printing papers, lightness adjustment functions may need to be selected according to the properties of the individual printing papers.

Figure 5:
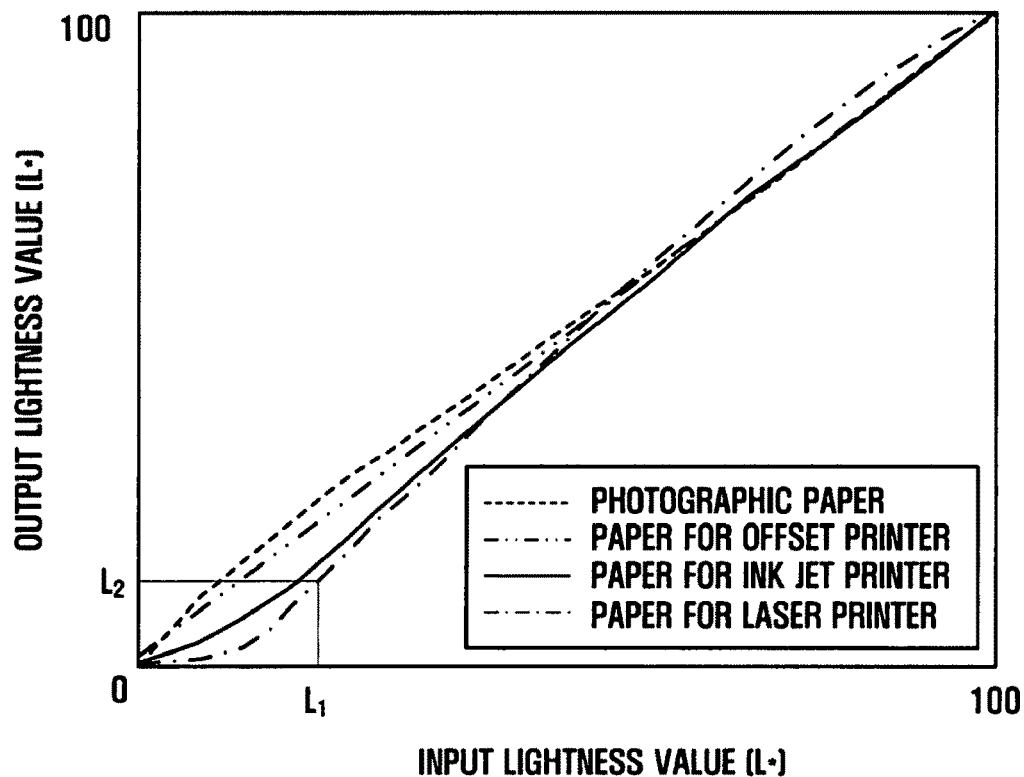
FIG. 5 illustrates a lightness adjustment function, according to an embodiment of the present invention.

FIG. 5 illustrates lightness adjustment functions that may be selected according to the properties of the individual printing papers. Four lightness adjustment functions shown in FIG. 5 may have, for example, linear shapes or curved shapes having at least one inflection point. It can be seen that the specific shapes of the lightness adjustment functions may be slightly different. The lightness adjustment functions may show patterns that are suitable for adjusting the lightness according to the kinds of the printing papers, and may show how input lightness values may need to be controlled. In the graph shown in FIG. 5, the horizontal axis represents an input lightness value (0 to 100). Further, the vertical axis represents an output lightness corresponding to the input lightness value.

From the curved lightness adjustment functions among the lightness adjustment functions shown in FIG. 5, it may be seen that, when an input lightness value $L_1$ at an inflection point is referred to as a critical value, a lightness adjustment level of an input lightness value smaller than the critical value and a lightness adjustment level of an input lightness value equal to or larger than the critical value may be different from each other. For example, in case of a laser printer paper, it can be seen that a lightness adjustment level may be high with respect to an input lightness value smaller than the critical value $L_1$, and a lightness adjustment level may be low with respect to an input lightness value equal to or larger than the critical value $L_1$ compared with the input lightness value smaller than the critical value $L_1$. The position of the inflection point in each of the lightness adjustment functions may be determined according to the property of a printing paper corresponding to the corresponding lightness adjustment function. The above-described lightness adjustment functions may be represented by Equation 1.

$$L_{out} = \begin{cases} L_2 \left(\frac{L_{in}}{L_1}\right)^\alpha, & \text{if } L_{in} < L_1 \\ (L_2 - L_{max})\left(\frac{L_{max} - L_{in}}{L_{max} - L_1}\right)^\beta + L_{max}, & \text{if } L_{in} \geq L_1 \end{cases} \quad \text{Equation 1}$$

In Equation 1, $L_{in}$ represents an input lightness value, and $L_{out}$ represents an output lightness value. Further, $L_1$ represents an input lightness value at an inflection point, and $L_2$ represents an output lightness value at an inflection point. $L_1$ and $L_2$ are typically set according to the properties of the individual printing papers, and the values may be obtained through preliminary experiments. In addition, $L_{max}$ represents a maximum input lightness value. In case of the CIE LCH, the maximum input lightness value is 100.

Meanwhile, in Equation 1, α and β may determine the shapes of graphs by the lightness adjustment functions. Specifically, α may determine the shapes of the graphs corresponding to a section from a minimum input lightness value to the critical value. For example, in Equation 1, when $L_1$ and $L_2$ have the same value and α is 1, the lightness adjustment functions may be shown as linear graphs in the corresponding section ($0 \leq L_{in} < L_1$). In contrast, when $L_1$ and $L_2$ have the same value and α is larger than 1, the lightness adjustment functions may be shown as curved graphs in the corresponding section ($0 \leq L_{in} < L_1$). The larger the value of α is, the larger the curve may be curved. That is, the difference between the input lightness value and the output lightness value may be increased.

While α may determine the shapes of the graphs corresponding to the section before the critical value, β may determine the shapes of the graphs corresponding to a section after the critical value. For example, in Equation 1, when $L_1$ and $L_2$ have the same value and β is 1, the lightness adjustment functions may be shown as linear graphs in the corresponding section ($L_{in} \geq L_1$). In contrast, when $L_1$ and $L_2$ have the same value and β is larger than 1, the lightness adjustment functions may be shown as curved graphs in the corresponding section ($L_{in} \geq L_1$). The larger the value of β is, the larger the curve is curved.

The values α and β may typically be set according to the properties of the printing papers within a predetermined range. For example, in case of a paper for a laser printer, since the lightness of black is reproduced brighter than other kinds of papers, it may be necessary to adjust the lightness of a black region in a scanned image dark. Accordingly, in a lightness adjustment function corresponding to a paper for a laser printer, it may be desirable to set α and β such that the output lightness value corresponding to the input lightness value may have a value smaller than the input lightness value.

Returning to FIG. 1, the correction unit 104 may correct the lightness of the CIE LCH values for the individual color patches with reference to the lightness adjustment functions shown in FIG. 5. As a result, first result values (CIE L'CH) whose lightness is corrected by the individual lightness adjustment functions may be generated.

Next, the correction unit 104 may correct the chroma in the first result values. To this end, the correction unit 104 may refer to chroma adjustment functions that may be selected according to the properties of the individual printing papers.

Figure 6:
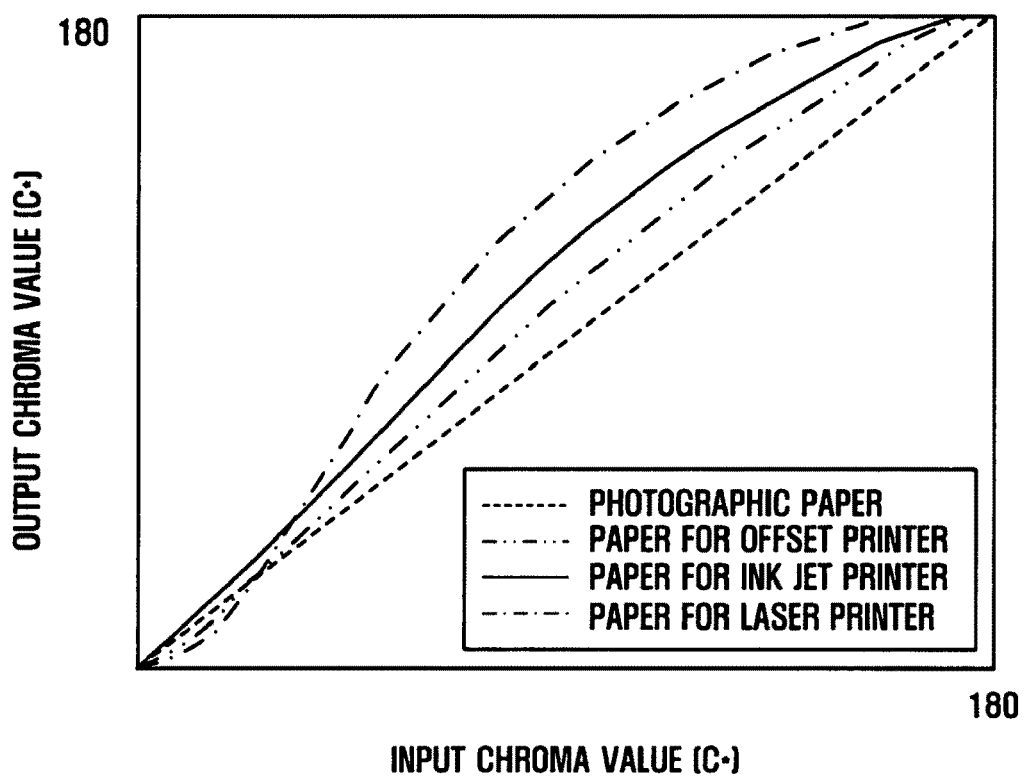
FIG. 6 illustrates a chroma adjustment function, according to an embodiment of the present invention.

FIG. 6 illustrates chroma adjustment functions that may be selected according to the properties of the individual printing papers. Four chroma adjustment functions shown in FIG. 6 have linear shapes or curved shapes. It can be seen that the specific shapes of the chroma adjustment functions may be slightly different. The chroma adjustment functions may show patterns that may be suitable for adjusting the chroma according to the kinds of the printing papers, and show how an input chroma value may have to be controlled. In the graph shown in FIG. 6, the horizontal axis may represent an input chroma value, and the vertical axis may represent an output chroma value corresponding to the input chroma value.

The chroma adjustment functions shown in FIG. 6 may be represented by Equation 2.

$$C_{out} = \begin{cases} C\left(\dfrac{C_{in}}{C}\right)^{\delta}, & \text{if } C_{in} < C \\ (C - C_{max})\left(\dfrac{C_{max} - C_{in}}{C_{max} - C}\right)^{\eta} + C_{max}, & \text{if } C_{in} \geq C \end{cases} \quad \text{Equation 2}$$

In Equation 2, $C_{in}$ represents an input chroma value, and $C_{out}$ represents an output chroma value. Further, $C_{max}$ represents a maximum input chroma value. In addition, C represents a critical value to divide a low-chroma region and a high-chroma region. The critical value may be set to prevent the chroma value of the low-chroma region from being increased.

Meanwhile, in Equation 2, $\delta$ and $\eta$ may determine the shapes of the graphs by the chroma adjustment functions. Specifically, $\delta$ may determine the shapes of the graphs corresponding to a section from a minimum input chroma value to the critical value. For example, in Equation 2, when $\delta$ is 1, the chroma adjustment functions may be shown as linear graphs in the corresponding section ($0 \leq C_{in} < C$). In contrast, when $\delta$ is larger than 1, the chroma adjustment functions may be shown as curved shapes in the corresponding section ($0 \leq C_{in} < C$). The larger the value of $\delta$ is, the larger the curve may be curved.

While $\delta$ may determine the shapes of the graphs corresponding to the section before the critical value, $\eta$ may determine the shapes of the graphs corresponding to a section after the critical value. For example, in Equation 2, when $\eta$ is 1, the chroma adjustment functions may be shown as linear shapes in the corresponding section ($C_{in} \geq C$). If $\eta$ is larger than 1, the chroma adjustment functions may be shown as curved shapes in the corresponding section ($C_{in} \geq C$).

The values $\delta$ and $\eta$ may typically be set according to the properties of the individual printing papers. The values of $\delta$ and $\eta$ may be determined through preliminary experiments.

Returning to FIG. 1, the correction unit 104 may correct the chroma of the first result values (CIE L'CH) with reference to the chroma adjustment functions shown in FIG. 6. As a result, second result values (CIE L'C'H) whose chroma is corrected by the chroma adjustment functions may be generated.

Next, the correction unit 104 may correct the hue of the second result values (CIE L'C'H). The hue correction may typically be performed by the kinds of the printing papers. To this end, hue adjustment functions that are selected according to the properties of the individual printing papers may be needed. Equation 3 represents the hue adjustment functions that may be selected according to the properties of the individual printing papers.

$$h_{out} = \begin{cases} (h_{in} - h_o)\left(\dfrac{h_2 - h_d}{h_2 - h_o}\right) + h_d, & \text{if } h_1 < h_{in} < h_o \\ (h_{in} - h_1)\left(\dfrac{h_d - h_1}{h_o - h_1}\right) + h_d, & \text{if } h_o < h_{in} < h_2 \\ h_{in}, & \text{elsewhere} \end{cases} \quad \text{Equation 3}$$

In Equation 3, $h_{in}$ represents an input hue angle, and $h_{out}$ represents an output hue angle. Further, $h_1$ and $h_2$ are critical values to divide a region where the hue correction is to be performed and a region where the hue correction is not performed. The hue correction typically is performed with respect to an input hue angle between $h_1$ and $h_2$, and is typically not performed with respect to input hue angles having other values. In addition, ho and hd are a reference value and a target value for the hue correction, respectively, and have values between $h_1$ and $h_2$. Here, the reference value may refer to a hue angle for conversion to the target value $h_d$. The values $h_0$ and $h_d$ may be set according to the types of the printing papers.

The values $h_1$, $h_2$, $h_o$, and $h_d$ may be set according to the properties of the individual printing papers. For example, in case of a paper for a laser printer, a lawn image is reproduced as yellowish green rather than as green. Accordingly, in the case of scanning laser printer paper on which a lawn image is reproduced, a lawn image region may need to be corrected to green. Considering the property of a paper for a printer, $h_1$ and $h_2$ in a hue adjustment function corresponding to a paper for a printer are preferably set such that the yellowish green may be converted and green may exist as a target between $h_1$ and $h_2$.

Figure 7:
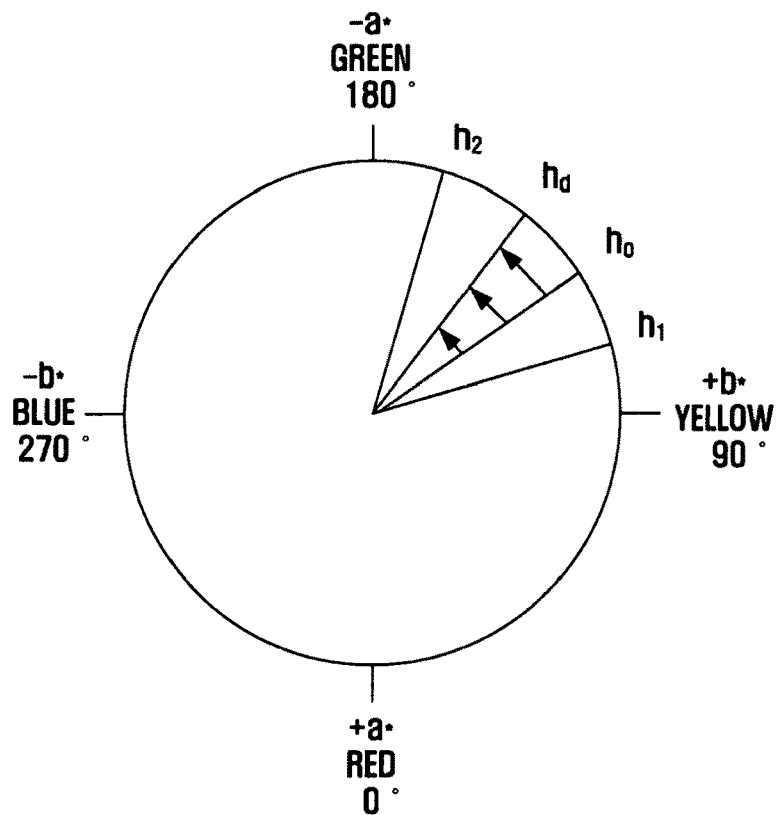
FIG. 7 illustrates a hue correction method according to an embodiment of the present invention.

FIG. 7 illustrates a process of correcting a hue on the basis of the hue adjustment function of Equation 3. The hue correction may be performed by linearly shifting an input hue angle between $h_1$ and $h_2$ toward $h_d$.

Returning to FIG. 1, the correction unit 104 may correct the hue of the second result values (CIE L' C'H) with reference to the hue adjustment function of Equation 3. As a result, third result values (CIE L'C'H') whose hue is corrected by the hue adjustment functions may be generated.

Figure 8:
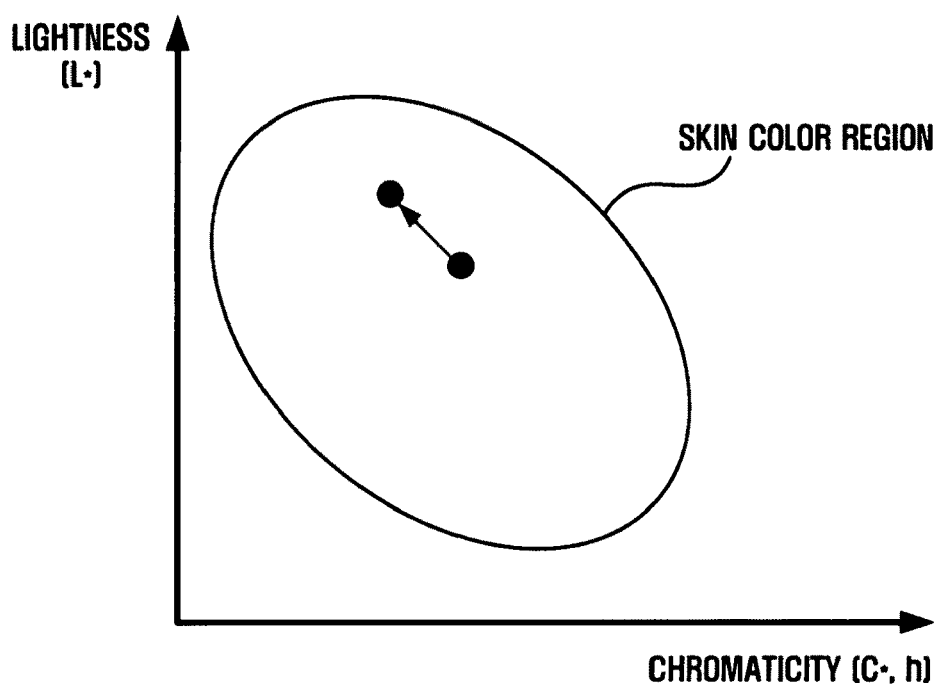
FIG. 8 is a diagram showing a skin color correction method, according to an embodiment of the present invention.

Next, the correction unit 104 may correct at least one of the lightness, saturation, and hue of the third result values (CIE L'C'H') according to kinds of images and may generate fourth result values (CIE L"C"H"). Specifically, the correction unit 104 may perform additional correction with respect to values of skin color regions in the third result values (CIE L'C'H'). For example, as shown in FIG. 8, the correction may be performed to increase the lightness and decrease the saturation. At this time, information about the skin color region and information required for correcting the values of the skin color regions (for example, information about how much the values of the skin color regions are moved in which direction within the CIE LCH color space) may be stored in the above-described storage unit 108.

Meanwhile, the correction unit 104 may perform only the saturation correction of the third result (CIE L'C'H'), separately from the correction of the skin color regions. This is to potentially obtain a clearer final image than the original image when a printing paper having a graphic image is scanned. For the saturation correction, the correction unit 104 may refer to the saturation adjustment functions of Equation 2.

The second conversion unit 105 may convert the fourth result values (CIE L"C"H") supplied from the correction unit 104 into values of the CIE LAB color space, and then supply the converted values to the gray balance control unit 106.

The gray balance control unit 106 may adjust the gray balances of the values (CIE L"A'B') supplied from the second conversion unit 105. The values (CIE L'"A"B") having the adjusted gray balances may be final correction values, which may be supplied to the look-up table generation unit 107.

The look-up table generation unit 107 may generate look-up tables having the standard measurement values by the individual color patches and the final correction values corresponding to the standard measurement values according to the types of printing papers and the kinds of the images. For example, a look-up table when a printing paper is a paper for a printer and the kind of an image is "character", a look-up table when a printing paper is a paper for a printer and the kind of an image is "graphic", and the like may be generated. The look-up tables may be stored in the above-described storage unit 108.

The user input unit 109 may receive a control command with respect to the color image scanning system 100 from the user. For example, the user input unit 109 may receive a control command to scan the second printing paper. Further, the user input unit 109 may receive a first selection value relative to the kind of the second printing paper and a second selection value relative to the kind of an image in the second printing paper from the user. The user input unit 109 may include a key for receiving the first selection value and a key for receiving the second selection value. Here, the keys may be implemented as icons in a user interface (not shown) for controlling the color image scanning system 100 or may be implemented at a specified position outside the color image scanning system 100 in hardware.

If the second color data obtained by scanning the second printing paper, the selection value relative to the type of second printing paper, and the selection value relative to the kind of image in the second printing paper are supplied, the final image generation unit 110 may correct the second color data with reference to a look-up table corresponding to the selection values among the look-up tables stored previously. As a result, a final image may be generated.

The output unit 111 may display the final image to the user. The output unit 111 may be implemented by any type of display unit, such as an LCD, a PDP, an LED, an OLED, and a flexible display.

Figure 9:
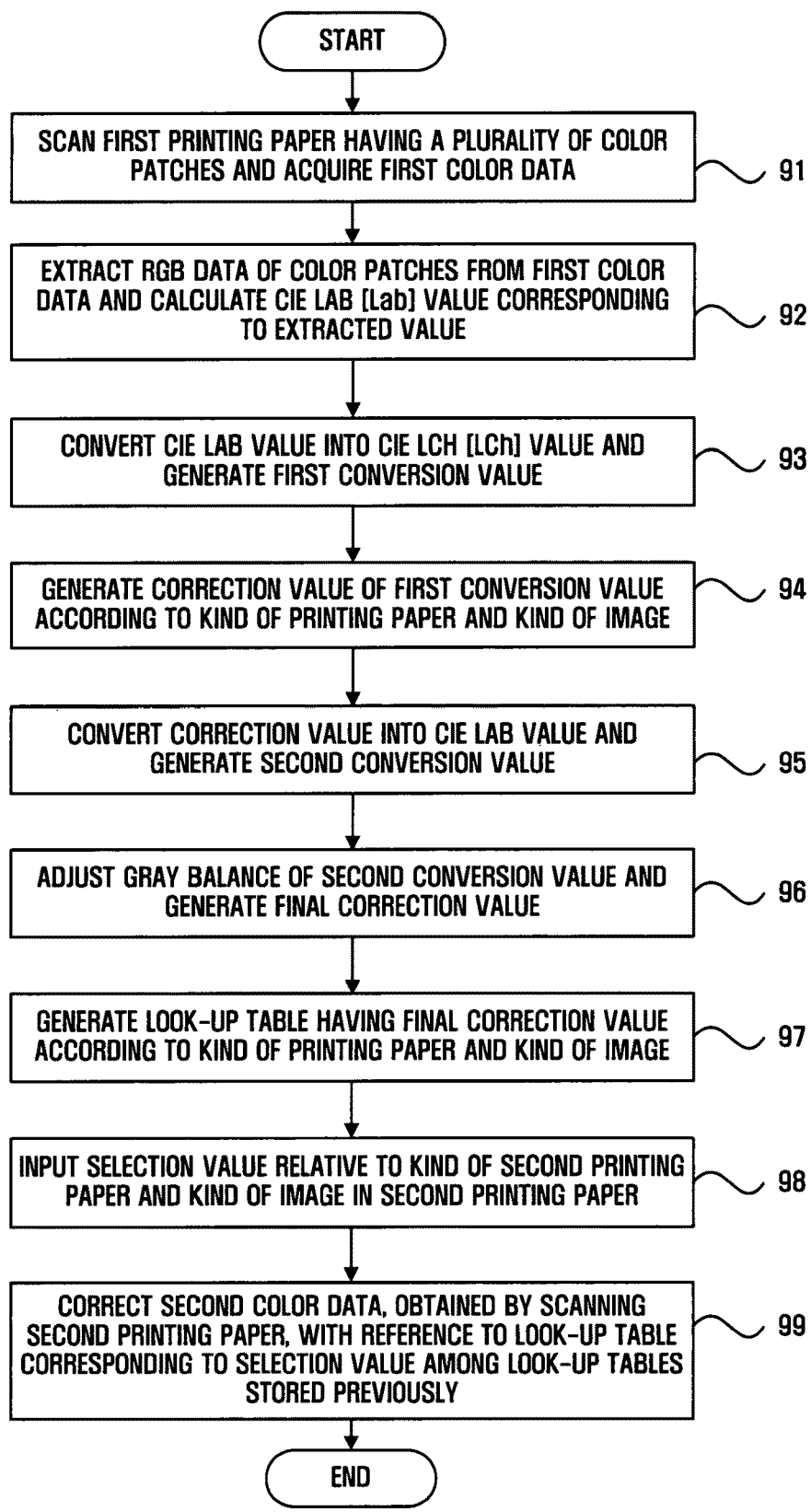
FIG. 9 illustrates the operation of a color image scanning system, such as shown in FIG. 1, according to an embodiment of the present invention.

FIG. 9 illustrates the operation of the color image scanning system 100 shown in FIG. 1.

In operation 91, the first printing paper 300 having a plurality of color patches may be scanned and the first color data may be generated, e.g., by the scanning unit 101.

In operation 92, the RGB data of the individual color patches may be extracted from the first color data, and the CIE LAB values corresponding to the extracted RGB data may be calculated, e.g., by the extraction unit 102.

In operation 93, the CIE LAB values may be converted into the CIE LCH values and the first conversion values may be generated, e.g., by the first conversion unit 103.

In operation 94, the first conversion values according to the type of the printing paper and the kind of the image in the printing paper may be corrected, and the correction values may be generated, e.g., by the correction unit 104. Operation 94 may be subdivided into a sub-operation in which the first result values having the adjusted lightness from the first conversion values using the lightness adjustment functions by the printing papers may be generated, a sub-operation in which the second result values having the adjusted saturation from the first result values using the chroma adjustment functions by the printing papers, may be generated, a sub-operation in which the third result values having the corrected hue from the second result values using the hue adjustment functions by the printing papers may be generated, and a sub-operation in which the fourth result values having at least one of the lightness, hue, and saturation adjusted according to the kinds of the image from the third result values may be generated.

In operation 95, the fourth result values may be converted into values of the CIE LAB color space, and the second conversion values may be generated, e.g., by the second conversion unit 105.

In operation 96, the gray balances of the second conversion values may be adjusted and the final correction values may be generated, e.g., by the gray balance control unit 106.

In operation 97, the look-up tables having the final correction values according to the kinds of the printing papers and the kinds of the images may be generated, e.g., by the look-up table generation unit 107. The look-up tables may then be stored, e.g., in the storage unit 108.

In operation 98, if the look-up tables are generated, the selection value relative to the type of second printing paper that the user wants to scan, the selection value relative to the kind of the image in the second printing paper, the control command, and the like may be received, e.g., by the user input unit 109. Then, the second printing paper may be scanned and the second color data may be generated, e.g, by the scanning unit 101.

In operation 99, the second color data may be corrected with reference to a look-up table corresponding to the selection values among the look-up tables previously stored, e.g., by the final image generation unit 110. As a result, the final image having corrected color data may be generated.

In the above-described embodiment, the color image scanning system, method and medium, in which the type of printing paper may be directly selected by the user has been described. In the following description, as another embodiment, a color image scanning 4 system, method and medium may automatically recognize the type of second printing paper and the kind of image in the second printing paper, and will be described with reference to FIGS. 10 to 13.

Figure 10:
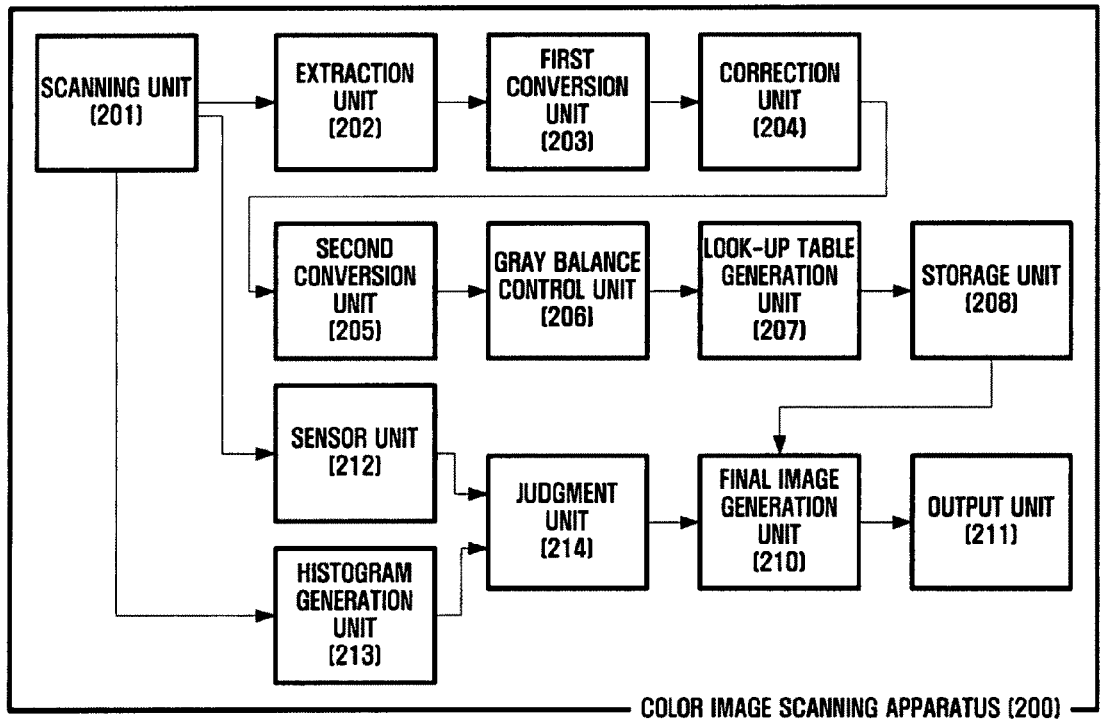
FIG. 10 illustrates the configuration of a color image scanning system, according to a second embodiment of the present invention.

FIG. 10 illustrates the structure of a color image scanning system 200, according to a second embodiment of the present invention. In FIG. 10, the operations of a scanning unit 201, a storage unit 208, an extraction unit 202, a first conversion unit 203, a correction unit 204, a second conversion unit 205, a gray balance control unit 206, a look-up table generation unit 207, and an output unit 211 are typically the same as those in FIG. 1, and therefore the descriptions thereof will be omitted. Accordingly, a description will be given focusing on the operations of, for example, a sensor unit 212, a histogram generation unit 213, a judgment unit 214, and a final image generation unit 210.

The sensor unit 212 may measure reflectance of the second printing paper that the user wants to scan. Specifically, the sensor unit 212 may irradiate the second printing paper with light having a predetermined wavelength, and may detect an amount of light reflected from the second printing paper (or an amount of light passing through the second printing paper). The detection result may be supplied to the judgment unit 214.

The histogram generation unit 213 may generate a color histogram relative to the second color data. In the color histogram, the horizontal axis may represent hue values (for example, RGB values) of pixels constituting the second color data. Further, the vertical axis may represent a frequency of a pixel with respect to each hue value.

The judgment unit 214 may compare the detection result of the sensor unit 212 and the previously stored data so as to judge the type of the second printing paper. If the type of the second printing paper is judged, the judgment unit 214 may supply a selection value corresponding to the type of the second printing paper to the final image generation unit 210.

Figure 11:
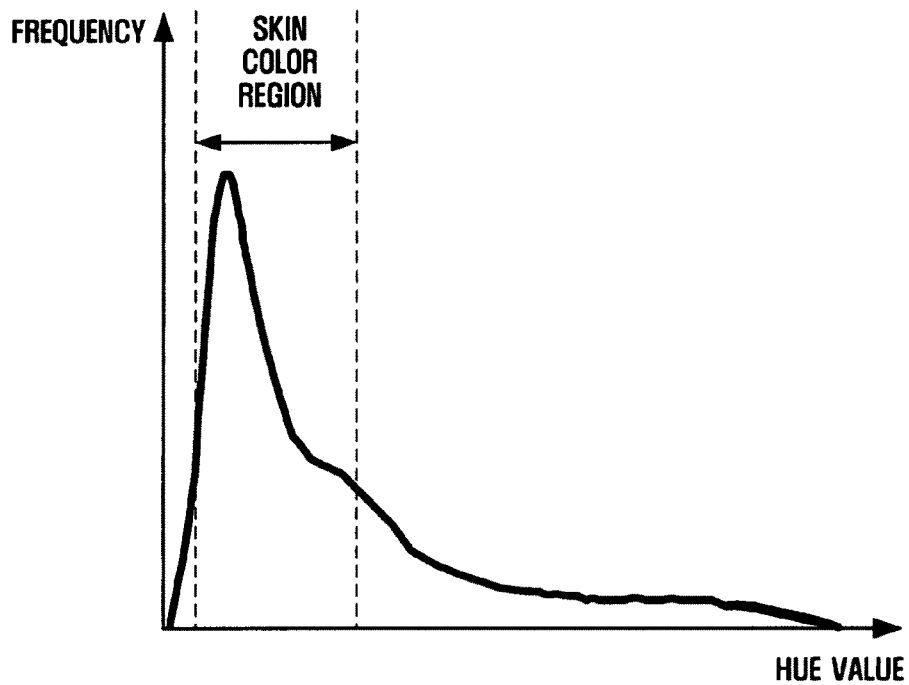
FIGS. 11 and 12 illustrate a hue histogram of an image obtained by scanning an arbitrary printing paper.
Figure 12:
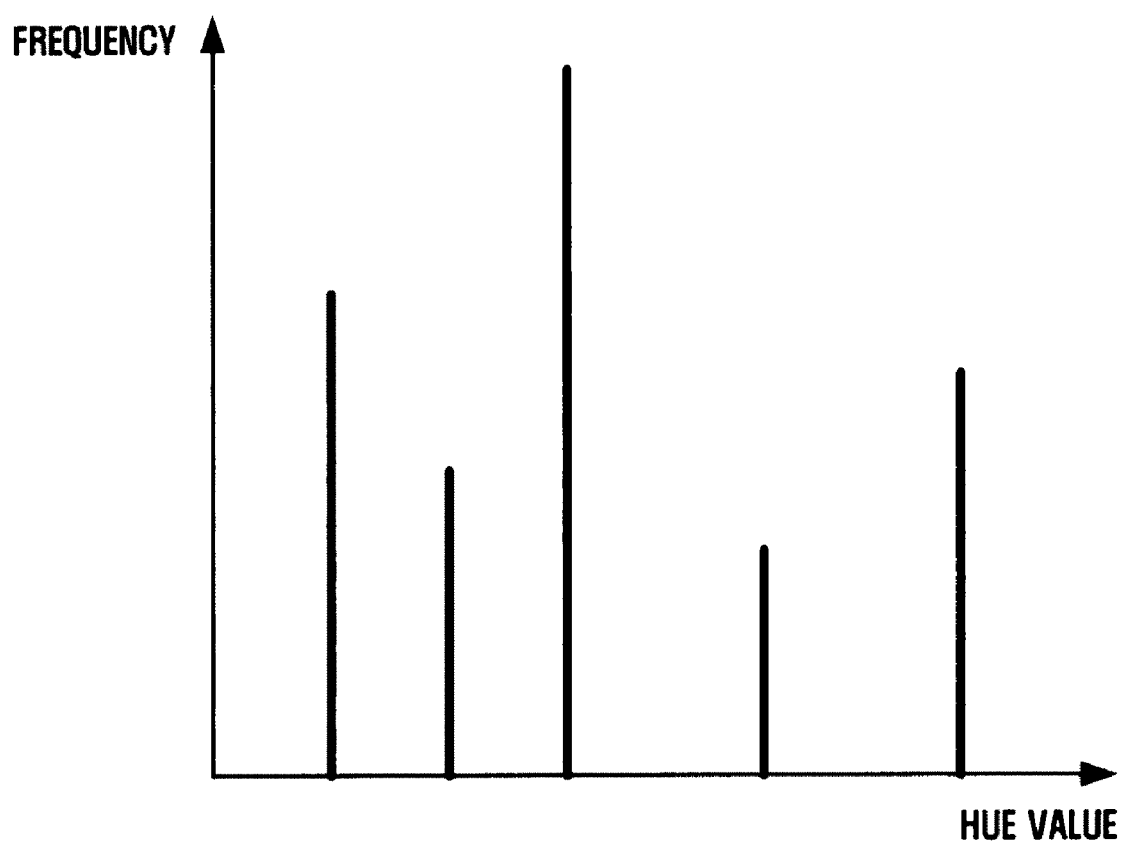

Further, the judgment unit 214 may analyze the color histogram generated by the histogram generation unit 213, and judge the kind of image included in the second printing paper. Specifically, as shown in FIG. 11, if the analysis result of the histogram by the second color data is discontinuous, the judgment unit 214 may judge that the second printing paper includes a graphic image. In contrast, for the analysis result of the color histogram of the second color data, as shown in FIG. 12, when the hue value is continuous and the frequency of the hue value in the skin color region is equal to or larger than the critical value, the judgment unit 214 may judge that the second printing paper includes a character image. If the hue value is continuous but the frequency of the hue value in the skin color region is smaller than the critical value, the judgment unit 214 may judge that the second printing paper includes an image other than a character image and a graphic image. As such, if the kind of the image in the second printing paper is judged, the judgment unit 214 may supply the selection value corresponding to the kind of the corresponding image to the final image generation unit 210.

The final image generation unit 210 may receive the selection value relative to the type of the second printing paper and the selection value relative to the kind of the image in the second printing paper from the judgment unit 214, and may then correct the second color data with reference to a look-up table corresponding to the two selection values among the look-up tables. As a result, the final image may be generated.

Figure 13:
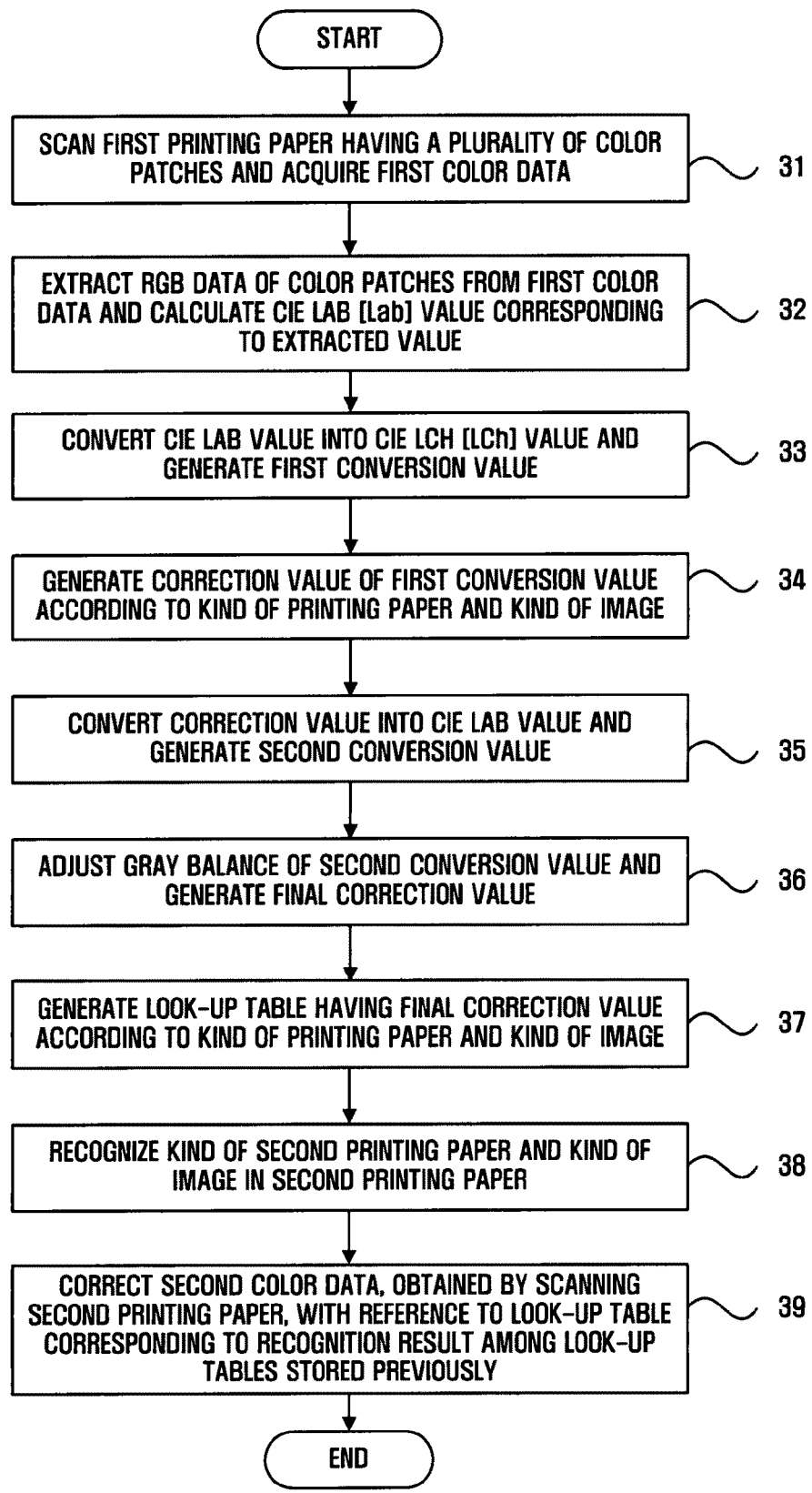
FIG. 13 illustrates the operation of a color image scanning system, according to a second embodiment of the present invention.

FIG. 13 illustrates the operation of the color image scanning system shown in FIG. 10.

In FIG. 13, operations 31 to 37 are generally the same as operations 91 to 97 of FIG. 9, and therefore the descriptions thereof will be omitted. Accordingly, a description will be given focusing on recognizing the type of the second printing paper and the kind of the image in the second printing paper, as in operation 38.

In operation 38, the second printing paper that the user wants to scan may be irradiated with light having a predetermined wavelength, and then light reflected from the second printing paper may be detected, e.g., by the sensor unit 212. The detection result and the data stored previously may be compared and the type of the second printing paper may be judged, e.g., by the judgment unit 214. Next, the selection value corresponding to the second printing paper may be supplied, e.g. by the sensor unit 212 to the final image generation unit 210.

Meanwhile, the second printing paper may be scanned and the second color data may be generated, e.g., by the scanning unit 201. Then, the color histogram of the second color data may be generated, e.g., by the histogram generation unit 213.

Next, the color histogram may be analyzed so as to judge the kind of the image in the second printing paper, e.g., by the judgment unit 214. The selection value corresponding to the judgment result may then be supplied, e.g., by the judgment unit 214 to the final image generation unit 210.

The second color data may be corrected, e.g., by the final image generation unit 210, with reference to a look-up table corresponding to the selection value supplied, e.g., from the judgment unit 214 among a plurality of previously stored look-up tables. As a result, the final image may be generated.

FIGS. 14A to 16D illustrate the color reproduction results when the related art and the present invention are applied. FIGS. 14A, 15A, 15C, 16A and 16C represent the color reproduction results according to the related art, and FIGS. 14B, 15B, 15D, 16B and 16D represent the color reproduction results according to one or more embodiments of the present invention.

Figure 14A:
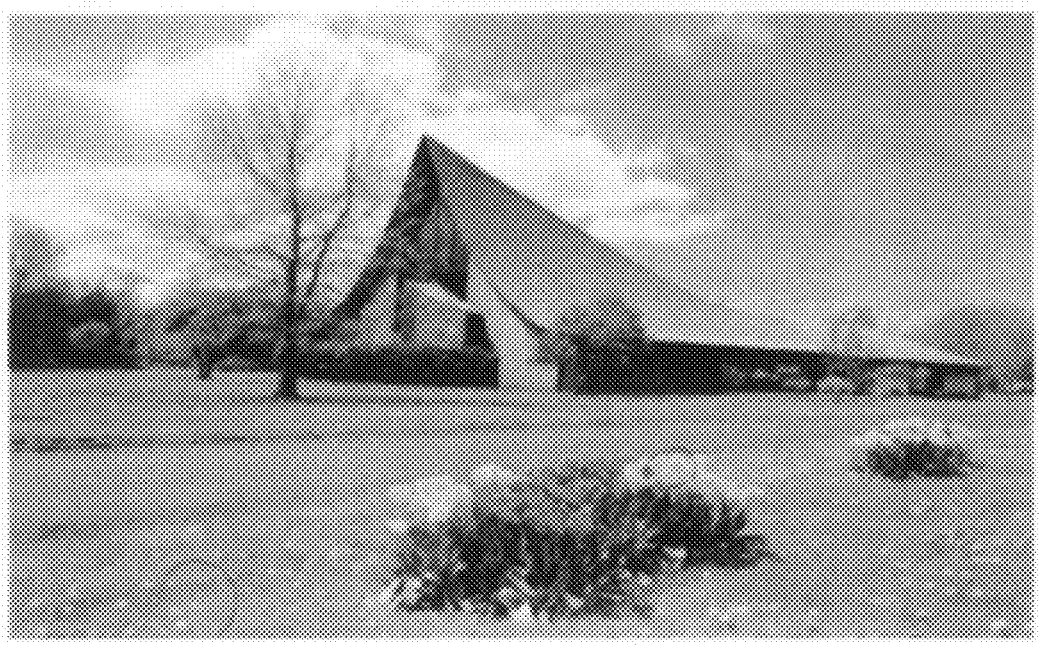
FIG. 14A illustrates the color reproduction result when the related art is applied to a paper for a laser printer.
Figure 14B:
FIG. 14B illustrates the color reproduction result when an embodiment of the present invention is applied to a paper for a laser printer.

First, FIGS. 14A and 14B show the color reproduction results of a paper for a laser printer for comparison. FIG. 14A shows the color reproduction result according to the related art, it can be seen that the hue of a lawn portion is reproduced with yellowish green. However, FIG. 14B shows the color reproduction result according to the present invention, it can be seen that the hue of the lawn portion is reproduced with near green and then near the original hue.

Figure 15A:
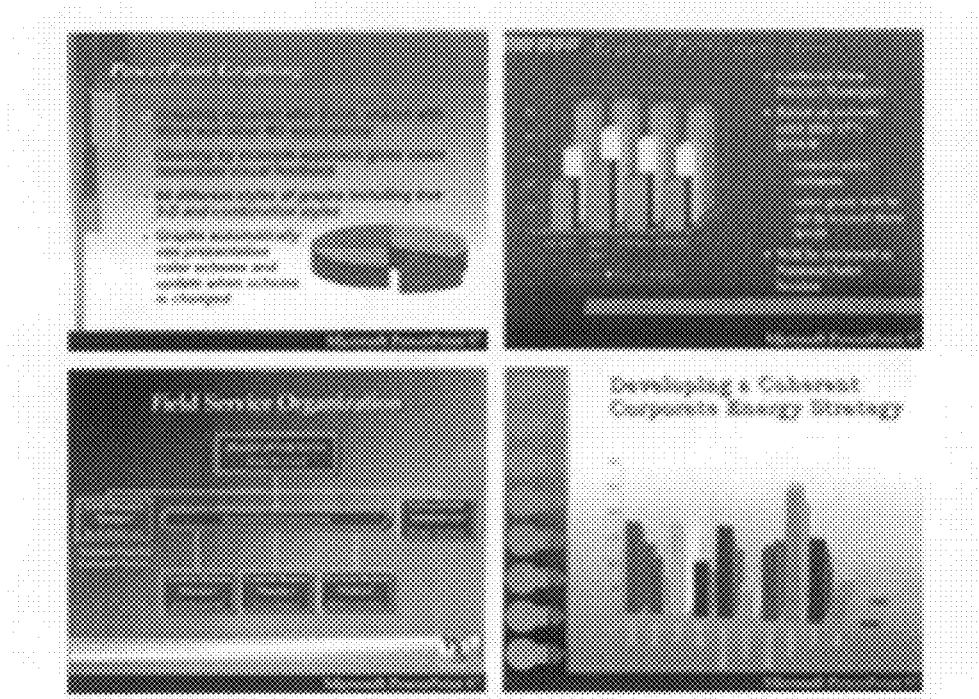
FIG. 15A illustrates the color reproduction result when the related art is applied to a paper having a graphic image.
Figure 15B:
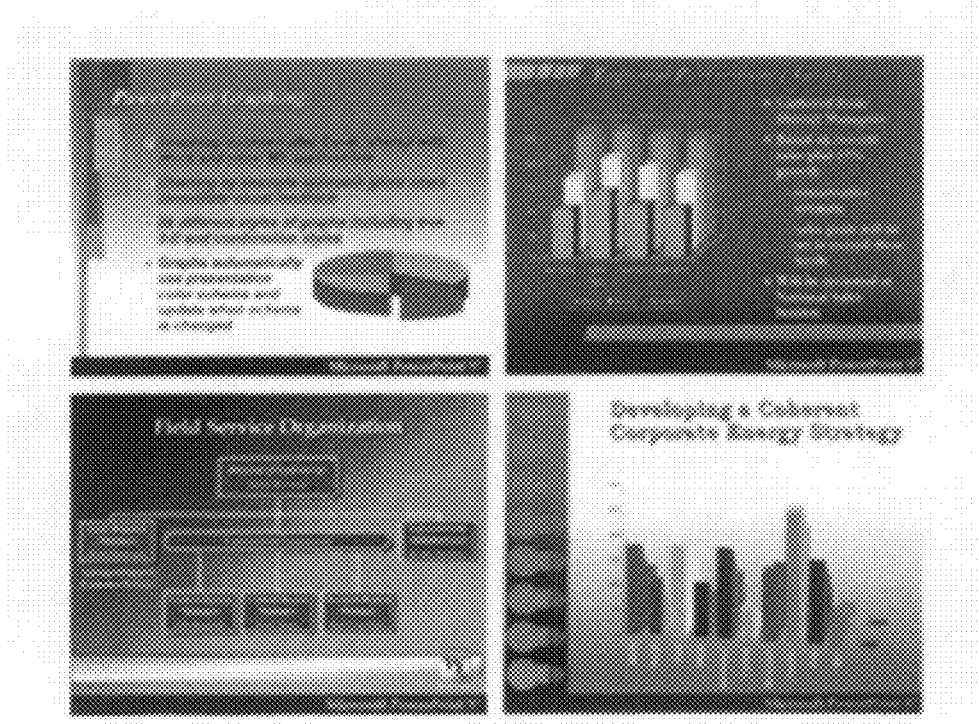
FIG. 15B illustrates the color reproduction result when an embodiment of the present invention is applied to a paper having a graphic image.
Figure 15C:
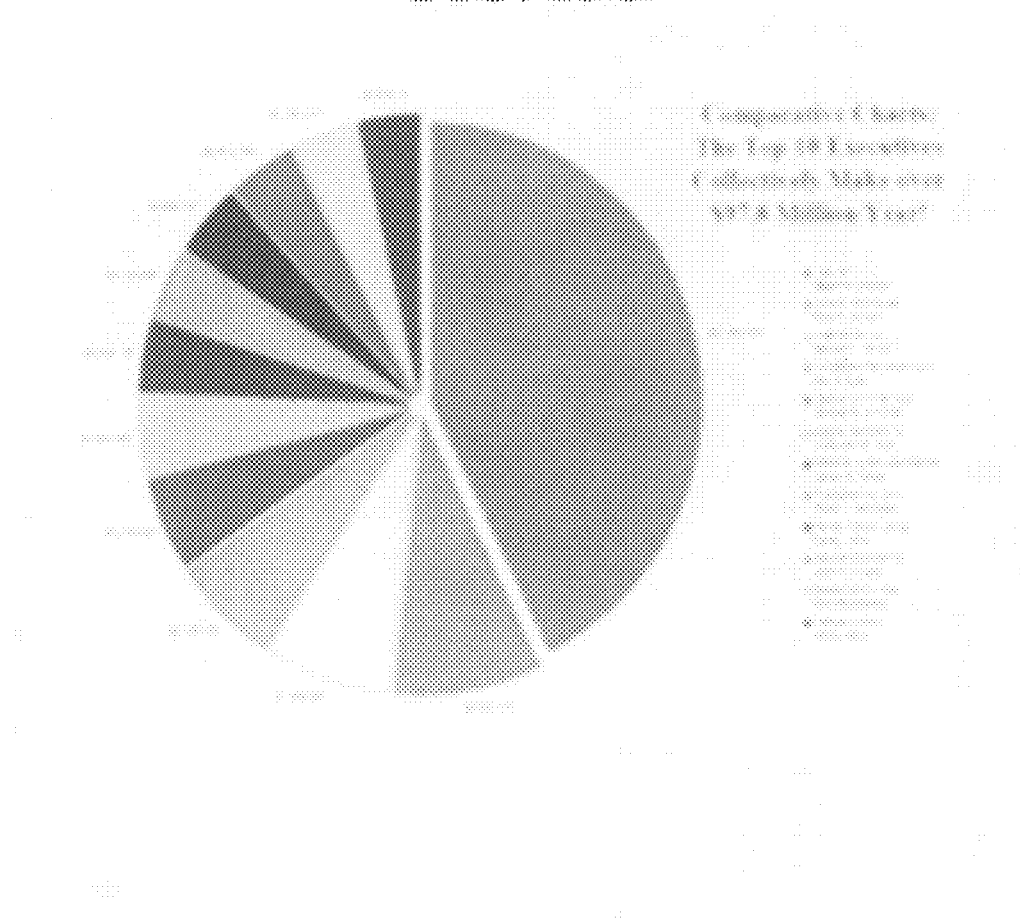
FIG. 15C illustrates the color reproduction result when the related art is applied to a paper having a graphic image.
Figure 15D:
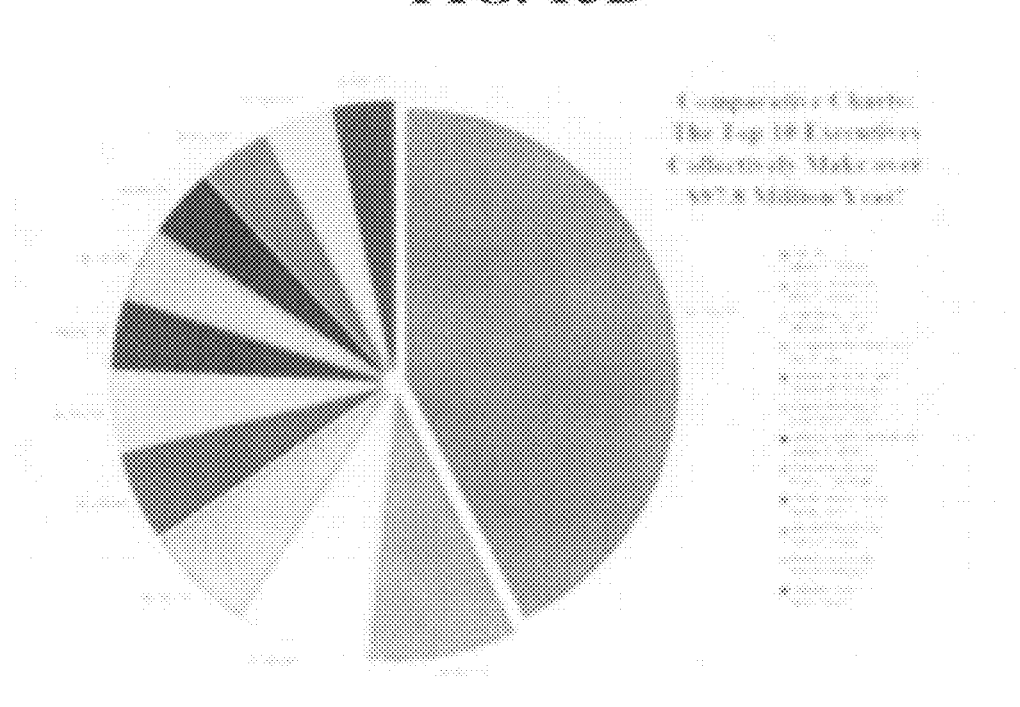
FIG. 15D illustrates the color reproduction result when an embodiment of the present invention is applied to a paper having a graphic image.

FIGS. 15A to 15D illustrate the color reproduction results of a printing paper having a graphic image for comparison. Referring to FIGS. 15B and 15D, the color reproduction results, according to one or more embodiments of the present invention, it can be seen that a vivid and deep hue is expressed compared with the color reproduction results illustrated in FIGS. 15A and 15C, according to the related art.

Figure 16A:
FIG. 16A illustrates the color reproduction result when the related art is applied to a printing paper having a character image.
Figure 16B:
FIG. 16B illustrates the color reproduction result when an embodiment of the present invention is applied to a printing paper having a character image.
Figure 16C:
FIG. 16C illustrates the color reproduction result when the related art is applied to a printing paper having a character image.
Figure 16D:
FIG. 16D illustrates the color reproduction result when an embodiment of the present invention is applied to a printing paper having a character image.

FIGS. 16A to 16D show the color reproduction results of a printing paper having a character image for comparison. Referring to FIGS. 16B and 16D, the color reproduction results, according to one or more embodiments of the present invention, it can be seen that a vivid and deep hue is expressed compared with the color reproduction results illustrated in FIGS. 16A and 16C, according to the related art. In particular, in the case of skin color, it can be seen that the color reproduction results illustrated in FIGS. 16B and 16D, according to one or more embodiments of the present invention are reproduced more naturally than the color reproduction results illustrated in FIGS. 16A and 16C, according to the related art.

As described above, according to the color image scanning system, method and medium of the present invention, the hue of the scanned image is corrected in consideration of the kind of the printing paper and the kind of the image, thereby improving color reproducibility of the scanned image. Therefore, user satisfaction can be increased.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A color image scanning system comprising:
   a storage unit to store look-up tables having correction values of first color data, obtained by scanning a first printing paper having a plurality of color patches, each of the look-up tables corresponding to a type of printing paper and a kind of image on the printing paper;
   a sensor unit measuring reflectance of a second printing paper;
   a histogram generation unit generating a hue histogram relative to second color data obtained by scanning the second printing paper;
   a judgment unit judging the kind of the second printing paper according to the measurement result, and judging the kind of the image in the second printing paper according to the analysis result of the hue histogram; and
   a final image generation unit to correct the second color data with reference to a look-up table of the look-up tables, the look-up table corresponding to the type of printing paper used by the second printing paper and the kind of image on the second printing paper
   wherein the judgment unit analyzes the hue histogram generated by the histogram generation unit and judges the kind of image included in the second printing paper and if the analysis result of the hue histogram is discontinuous, the judgment unit judges that the second printing paper includes a graphic image, and if the analysis result of the hue histogram is continuous and a frequency of the hue value in the skin color region is equal to or larger than a critical value, the judgment unit judges that the second printing paper includes a character image, and if the hue value is continuous but the frequency of the hue value in the skin color region is smaller than the critical value, the judgment unit judges that the second printing paper includes an image other than the character image and the graphic image.

2. The color image scanning system of claim 1, further comprising:
   a scanning unit to scan the first printing paper so as to generate the first color data;
   an extraction unit to extract color data of the plurality of color patches from the first color data;
   a correction unit to correct the extracted color data according to the type of the printing paper and the kind of image so as to generate the correction values; and
   a look-up table generation unit to generate the look-up tables having the correction values according to the type of printing paper.

3. The color image scanning system of claim 2, wherein the correction unit corrects at least one of lightness, hue, and saturation of the extracted color data.

4. The color image scanning system of claim 3, wherein the correction unit corrects the lightness of the extracted color data on the basis of lightness adjustment functions corresponding to the type of printing paper.

5. The color image scanning system of claim 4, wherein the lightness adjustment functions are represented by $$L_{out} = \begin{cases} L_2 \left( \dfrac{L_{in}}{L_1} \right)^\alpha, & \text{if } L_{in} < L_1 \\ (L_2 - L_{max}) \left( \dfrac{L_{max} - L_{in}}{L_{max} - L_1} \right)^\beta + L_{max}, & \text{if } L_{in} \geq L_1 \end{cases},$$

where $L_{in}$ represents an input lightness value, $L_{out}$ represents an output lightness value, $L_{max}$ represents a maximum input lightness value, and $L_1$, $L_2$, $\alpha$, and $\beta$ are constants.

6. The color image scanning system of claim 5, wherein $L_1$ represents an input lightness value at an inflection point where a shape of a graph of each of the lightness adjustment functions changes, $L_2$ represents an output lightness value at the inflection point, $\alpha$ is a constant to determine a lightness adjustment level with respect to an input lightness value less than the inflection point, $\beta$ is a constant to determine a lightness adjustment level with respect to an input lightness value equal to or more than the inflection point, and $L_1$, $L_2$, $\alpha$, and $\beta$ are set according to the type of printing paper.

7. The color image scanning system of claim 3, wherein the correction unit corrects the saturation of the extracted color data on the basis of chroma adjustment functions corresponding to the type of printing paper.

8. The color image scanning system of claim 7, wherein the chroma adjustment functions are represented by $$C_{out} = \begin{cases} C \left( \dfrac{C_{in}}{C} \right)^\delta, & \text{if } C_{in} < C \\ (C - C_{max}) \left( \dfrac{C_{max} - C_{in}}{C_{max} - C} \right)^\eta + C_{max}, & \text{if } C_{in} \geq C \end{cases},$$

where $C_{in}$ represents an input chroma value, $C_{out}$ represents an output chroma value, $C_{max}$ represents a maximum input chroma value, C represents a critical value to divide a low-saturation region and a high-saturation region, $\delta$ is a constant to determine a chroma adjustment level of the low-saturation region, and $\eta$ is a constant to determine a chroma adjustment level of the high-saturation region.

9. The color image scanning system of claim 8, wherein C, $\delta$, and $\eta$ are set according to the type of printing paper.

10. The color image scanning system of claim 3, wherein the correction unit corrects the hue of the extracted color data on the basis of hue adjustment functions corresponding to the type of printing paper.

11. The color image scanning system of claim 10, wherein the hue adjustment functions are represented by $$h_{out} = \begin{cases} (h_{in} - h_o) \left( \dfrac{h_2 - h_d}{h_2 - h_o} \right) + h_d, & \text{if } h_1 < h_{in} < h_o \\ (h_{in} - h_1) \left( \dfrac{h_d - h_1}{h_o - h_1} \right) + h_d, & \text{if } h_o < h_{in} < h_2 \\ h_{in}, & \text{elsewhere} \end{cases},$$

where $h_{in}$ represents an input hue angle, $h_{out}$ represents an output hue angle, $h_1$ and $h_2$ represent critical values with respect to a region where hue correction is to be performed, and $h_o$ and $h_d$ are constants between $h_1$ and $h_2$.

12. The color image scanning system of claim 11, wherein $h_1$, $h_2$, $h_o$, and $h_d$ are set according to the type of printing paper.

13. The color image scanning system of claim 1, further comprising:
   a gray balance control unit controlling gray balances of the correction values.

14. The color image scanning system of claim 1, further comprising:
   a user input unit receiving a selection value relative to the second printing paper.

15. The color image scanning system of claim 1, wherein the look-up tables include the correction values and standard measurement values of the plurality of color patches.

16. The color image scanning system of claim 1, further comprising:
   a sensor unit measuring reflectance of the second printing paper; and
   a judgment unit judging the type of the second printing paper according to the measurement result.

17. A color image scanning method implemented by a color image scanning system comprising a processor having computing device-executable instructions, the method comprising:
   storing look-up tables having correction values of first color data, obtained by scanning a first printing paper having a plurality of color patches, each of the look-up tables corresponding to a type of printing paper and a kind of image on the printing paper;
   measuring reflectance of a second printing paper;
   generating a hue histogram relative to second color data obtained by scanning the second printing paper;

judging the kind of the second printing paper according to the measurement result, and judging the kind of the image in the second printing paper according to the analysis result of the hue histogram; and correcting the second color data using the processor with reference to a look-up table of the look-up tables, the look-up table corresponding to the type of printing paper used by the second printing paper and the kind of image on the second printing paper, wherein the judging of the kind of the second paper further comprises:

analyzing the hue histogram and judging the kind of image included in the second printing paper, and if the analysis result of the hue histogram generated relative to the second color data is discontinuous, judging that the second printing paper includes a graphic image, and if the analysis result of the hue histogram generated relative to the second color data is continuous and the frequency of the hue value in the skin color region is equal to or larger than a critical value, judging that the second printing paper includes a character image, and if the hue value is continuous but the frequency of the hue value in the skin color region is smaller than the critical value, judging that the second printing paper includes an image other than the character image and the graphic image.

18. The color image scanning method of claim 17, further comprising:

scanning the first printing paper so as to generate the first color data;

extracting color data of the plurality of color patches from the first color data;

correcting the extracted color data according to the type of printing paper and the kind of image so as to generate the correction values; and generating the look-up tables having the correction values according to the type of printing paper.

19. The color image scanning method of claim 17, wherein the correcting of the extracted color data comprises correcting at least one of lightness, saturation, and hue of the extracted color data.

20. The color image scanning method of claim 19, wherein the correcting of at least one of the lightness, saturation, and hue of the extracted color data comprises correcting the lightness of the extracted color data on the basis of lightness adjustment functions corresponding to the type of printing paper.

21. The color image scanning method of claim 20, wherein the lightness adjustment functions are represented by $$L_{out} = \begin{cases} L_2 \left(\frac{L_{in}}{L_1}\right)^\alpha, & \text{if } L_{in} < L_1 \\ (L_2 - L_{max})\left(\frac{L_{max} - L_{in}}{L_{max} - L_1}\right)^\beta + L_{max}, & \text{if } L_{in} \geq L_1 \end{cases},$$

where $L_{in}$ represents an input lightness value, $L_{out}$ represents an output lightness value, $L_{max}$ represents a maximum input lightness value, and $L_1$, $L_2$, $\alpha$, and $\beta$ are constants.

22. The color image scanning method of claim 21, wherein $L_1$ represents an input lightness value at an inflection point where a shape of a graph of each of the lightness adjustment functions changes, $L_2$ represents an output lightness value at the inflection point, $\alpha$ is a constant to determine a lightness adjustment level with respect to an input lightness value less than the inflection point, $\beta$ is a constant to determine a lightness adjustment level with respect to an input lightness value equal to or more than the inflection point, and $L_1$, $L_2$, $\alpha$, and $\beta$ are set according to the type of printing paper.

23. The color image scanning method of claim 19, wherein the correcting of at least one of the lightness, saturation, and hue of the extracted color data comprises correcting the saturation of the extracted color data on the basis of chroma adjustment functions corresponding to the type of printing paper.

24. The color image scanning method of claim 23, wherein the chroma adjustment functions are represented by $$C_{out} = \begin{cases} C\left(\frac{C_{in}}{C}\right)^\delta, & \text{if } C_{in} < C \\ (C - C_{max})\left(\frac{C_{max} - C_{in}}{C_{max} - C}\right)^\eta + C_{max}, & \text{if } C_{in} \geq C \end{cases},$$

where $C_{in}$ represents an input chroma value, $C_{out}$ represents an output chroma value, $C_{max}$ represents a maximum input chroma value, C represents a critical value to divide a low-saturation region and a high-saturation region, $\delta$ is a constant to determine a chroma adjustment level of the low-saturation region, and $\eta$ is a constant to determine a chroma adjustment level of the high-saturation region.

25. The color image scanning method of claim 24, wherein C, $\delta$, and $\eta$ are set according to the type of printing paper.

26. The color image scanning method of claim 19, wherein the correcting of at least one of the lightness, saturation, and hue of the extracted color data comprises correcting the hue of the extracted color data on the basis of hue adjustment functions corresponding to the type of printing paper.

27. The color image scanning method of claim 26, wherein the hue adjustment functions are represented by $$h_{out} = \begin{cases} (h_{in} - h_o)\left(\frac{h_2 - h_d}{h_2 - h_o}\right) + h_d, & \text{if } h_1 < h_{in} < h_o \\ (h_{in} - h_1)\left(\frac{h_d - h_1}{h_o - h_1}\right) + h_d, & \text{if } h_o < h_{in} < h_2 \\ h_{in}, & \text{elsewhere} \end{cases},$$

where $h_{in}$ represents an input hue angle, $h_{out}$ represents an output hue angle, $h_1$ and $h_2$ represent critical values with respect to a region where hue correction is to be performed, and $h_o$ and $h_d$ are constants between $h_1$ and $h_2$.

28. The color image scanning method of claim 27, wherein $h_1$, $h_2$, $h_o$, and $h_d$ are set according to the type of printing paper.

29. The color image scanning method of claim 17, further comprising:

controlling gray balances of the correction values.

30. The color image scanning method of claim 17, further comprising:

receiving a selection value relative to the second printing paper.

31. The color image scanning method of claim 17, wherein the look-up tables include the correction values and standard measurement values of the plurality of color patches.

32. The color image scanning method of claim 17, further comprising:

measuring reflectance of the second printing paper; and judging the type of the second printing paper according to the measurement result.

* * * * *